US009401905B1

(12) United States Patent
Kowalski et al.

(10) Patent No.: US 9,401,905 B1
(45) Date of Patent: Jul. 26, 2016

(54) TRANSFERRING SOFT TOKEN AUTHENTICATION CAPABILITIES TO A NEW DEVICE

(71) Applicant: EMC Corporation, Hopkinton, MA (US)

(72) Inventors: Karl G. Kowalski, Arlington, MA (US); Millie K. Ng, Bedford, MA (US); Michael J. O'Malley, Lowell, MA (US); Daniel V. Bailey, Pepperell, MA (US)

(73) Assignee: EMC Corporation, Hopkinton, MA (US)

( * ) Notice: Subject to any disclaimer, the term of this patent is extended or adjusted under 35 U.S.C. 154(b) by 237 days.

(21) Appl. No.: 14/036,627

(22) Filed: Sep. 25, 2013

(51) Int. Cl.
*H04L 29/06* (2006.01)

(52) U.S. Cl.
CPC ...................................... *H04L 63/08* (2013.01)

(58) Field of Classification Search
CPC ........................................................ H04L 63/08
USPC ................................................................ 726/6
See application file for complete search history.

(56) References Cited

U.S. PATENT DOCUMENTS

| | | | | |
|---|---|---|---|---|
| 6,148,404 A * | 11/2000 | Yatsukawa | ......................... | 726/2 |
| 7,093,130 B1 * | 8/2006 | Kobayashi et al. | ............ | 713/176 |
| 7,366,913 B1 * | 4/2008 | Haley | ..................... | G06Q 20/32 235/380 |
| 7,886,345 B2 | 2/2011 | Kaliski et al. | | |
| 7,904,946 B1 * | 3/2011 | Chu | ....................... | H04L 63/067 726/10 |
| 8,171,137 B1 * | 5/2012 | Parks | .................... | G06F 9/4856 705/6 |
| 8,307,410 B2 * | 11/2012 | Martin et al. | ..................... | 726/4 |
| 8,600,941 B1 | 12/2013 | Raj et al. | | |
| 8,683,563 B1 | 3/2014 | van Dijk et al. | | |
| 8,683,570 B1 | 3/2014 | van Dijk et al. | | |
| 8,707,050 B1 | 4/2014 | Robinson et al. | | |
| 8,751,801 B2 | 6/2014 | Harris et al. | | |
| 8,752,145 B1 | 6/2014 | Dotan et al. | | |
| 8,752,156 B1 | 6/2014 | van Dijk et al. | | |
| 8,819,769 B1 | 8/2014 | Van Dijk et al. | | |
| 8,875,263 B1 | 10/2014 | Van Dijk et al. | | |

(Continued)

OTHER PUBLICATIONS

Research in Motion Limited, 'BlackBerry Enterprise Solution and RSA SecurID—Leveraging Two-Factor Authentication to Provide Secure Access to Corporate Resources from BlackBerry Devices', 2006, Research in Motion Limited, entire document, http://www.blackberry.com/products/pdfs/bb_rsa_whitepaper.pdf.*

(Continued)

*Primary Examiner* — Luu Pham
*Assistant Examiner* — Ronald Baum
(74) *Attorney, Agent, or Firm* — BainwoodHuang

(57) ABSTRACT

A technique transfers soft token authentication capabilities from an old device to a new device. The technique involves receiving a transfer initiation message from the old device while the old device is currently provisioned with the soft token authentication capabilities. The transfer initiation message includes new device binding information obtained by the old device from the new device. The technique further involves providing a reply message to the old device in response to the transfer initiation message. The reply message directs the old device to supply an authentication code to the new device, the authentication code being based on the new device binding information. The technique further involves receiving, from the new device, a provisioning message including the authentication code, and provisioning the new device with the soft token authentication capabilities in response to receipt of the provisioning message from the new device.

22 Claims, 5 Drawing Sheets

(56) References Cited

U.S. PATENT DOCUMENTS

| | | | |
|---|---|---|---|
| 8,955,069 B1 | 2/2015 | Dotan et al. | |
| 2002/0095454 A1* | 7/2002 | Reed | G06Q 30/0601 709/201 |
| 2003/0063742 A1* | 4/2003 | Neufeld et al. | 380/46 |
| 2003/0159036 A1* | 8/2003 | Walmsley et al. | 713/168 |
| 2003/0172090 A1* | 9/2003 | Asunmaa | G06F 21/31 |
| 2004/0117623 A1* | 6/2004 | Kalogridis et al. | 713/165 |
| 2005/0021982 A1* | 1/2005 | Popp et al. | 713/184 |
| 2005/0044361 A1* | 2/2005 | Chang | G06F 21/10 713/167 |
| 2005/0108534 A1* | 5/2005 | Bajikar | G06F 21/606 713/172 |
| 2006/0083228 A1* | 4/2006 | Ong et al. | 370/389 |
| 2007/0130472 A1* | 6/2007 | Buer et al. | 713/182 |
| 2008/0313726 A1* | 12/2008 | Gardner | 726/9 |
| 2009/0235083 A1* | 9/2009 | Bleahen | 713/178 |
| 2011/0078245 A1* | 3/2011 | Kiffer | G06Q 20/3278 709/204 |
| 2012/0306622 A1* | 12/2012 | Trinh | H04L 63/08 340/10.1 |
| 2013/0097427 A1* | 4/2013 | Billings et al. | 713/182 |
| 2013/0318343 A1* | 11/2013 | Bjarnason | H04L 41/0809 713/157 |

OTHER PUBLICATIONS

Bolhuis, M., 'Using an NFC-equipped mobile phone as a token in physical access control', Jul. 2, 2014, Nedap Securiy Management, entire document, http://essay.utwente.nl/65419/1/thesis_nfc_martijn_bolhuis_final.pdf.*

* cited by examiner

TRANSFERRING SOFT TOKEN AUTHENTICATION CAPABILITIES TO A NEW DEVICE

BACKGROUND

An authentication token is a physical device which outputs a series of passcodes (e.g., one-time use passcodes or OTPs) for use by a user to authenticate with an authentication server. The authentication token generates each passcode based on a token seed (or secret). To properly authenticate, the user provides a current passcode from the authentication token to an authentication server. If the authentication server matches the current passcode to an expected passcode for that user, authentication is deemed successful. If the current passcode does not match the expected passcode, authentication is deemed unsuccessful.

One conventional way to form an authentication token is to install new authentication software on a smart device such as a personal computer, a tablet or a smart phone and then provision the smart device with the token seed. When the smart device runs the authentication software with the provisioned token seed, the smart device operates as an authentication token. Typically, to equip the smart device with the token seed, a human authentication expert (i.e., an Authentication Service administrator) participates in deployment of the token seed within the smart device to ensure that the process is performed securely and successfully.

SUMMARY

Suppose that a user wishes to upgrade from an existing mobile smart device to a new mobile smart device. Further suppose that the existing mobile smart device is currently configured to operate as an authentication token on behalf of the user, and that the user wishes to have the new smart device operate as the authentication token in place of the existing mobile smart device.

One approach is for the user to simply install the authentication software on the new mobile smart device and then involve the Authentication Service administrator to properly deploy a new token seed within the new mobile smart device. Unfortunately, this approach requires the Authentication Service administrator to participate during the token seed deployment process.

Another approach is to equip the existing mobile smart device with the ability to automatically handover its authentication token features to the new mobile smart device. Unfortunately, this approach does not inform the authentication service of the handover. Moreover, the existing mobile smart device could be restored from a backup thus enabling the authentication token features to run on multiple smart devices simultaneously.

In contrast to the above-described approaches to moving token features from an existing mobile smart device to a new mobile smart device, improved techniques transfer soft token authentication capabilities between devices via communications involving (i) an old device, a new device, and an authentication server. Since the old device is involved, the transfer is able to rely on trust invoked by the old device thus alleviating the need for a human authentication expert (e.g., an Authentication Service administrator) to participate during the transfer. Additionally, since the authentication server is involved, the transfer can be logged and steps can be taken to prevent restoration of the old device (e.g., the authentication token capabilities of old device can be disabled).

One embodiment is directed to a method of transferring soft token authentication capabilities from an old device to a new device. The method includes receiving, by processing circuitry, a transfer initiation message from the old device while the old device is currently provisioned with the soft token authentication capabilities. The transfer initiation message includes new device binding information obtained by the old device from the new device. The method further includes providing, by the processing circuitry, a reply message to the old device in response to the transfer initiation message. The reply message directs the old device to supply an authentication code to the new device, the authentication code being based on the new device binding information. The method further includes receiving, by the processing circuitry, a provisioning message from the new device, the provisioning message including the authentication code supplied by the old device, and provisioning, by the processing circuitry, the new device with the soft token authentication capabilities in response to receipt of the provisioning message from the new device.

In some arrangements, receiving the transfer initiation message includes obtaining, as parts of the transfer initiation message, (i) a first message portion which includes the new device binding information in non-signed form and (ii) a second message portion which includes the new device binding information in a modified form (e.g., signed, hashed, etc.). In these arrangements, the second message portion effectively operates as a signature of the old device which is verifiable by the processing circuitry.

In some arrangements, the old device stores a token seed, and the old device is under control of a user having a user personal identifier (or user PIN). Additionally, obtaining the second message portion includes acquiring, as the second message portion, a signature data element which is based on (i) the new device binding information, (ii) the user personal identifier of the user, and (iii) the token seed stored in the old device.

In some arrangements, the reply message provided to the old device does not include the authentication code. In these arrangements, receiving the provisioning message from the new device includes acquiring, as the authentication code, the signature data element from the new device after the new device receives the signature data element from the old device.

In some arrangements, prior to receiving the transfer initiation message, the processing circuitry performs a first dynamic seed provisioning exchange with the old device to provision the old device with the soft token authentication capabilities. In these arrangements, provisioning the new device with the soft token authentication capabilities includes performing, by the processing circuitry, a second dynamic seed provisioning exchange with the new device.

In some arrangements, the first dynamic seed provisioning exchange provisions a first seed within the old device. Additionally, performing the second dynamic seed provisioning exchanging includes provisioning a second seed within the new device, the second seed being different from the old device.

In some arrangements, the method further comprises starting, in response to providing the reply message to the old device, a timer to impose a time limit for transferring soft token authentication capabilities to the new device. In these arrangements, the method may further comprise accessing the timer, in response to receiving the provisioning message and prior to provisioning the new device with the soft token authentication capabilities, to confirm that the time limit has not expired.

In some arrangements, the method further includes disabling, in response to provisioning the new device with the soft token authentication capabilities, the soft token authentication capabilities provisioned on the old device. Accordingly, the seed on the old device becomes unusable even if retained.

In some arrangements, the method further includes performing, prior to receiving the transfer initiation message from the old device, an authentication operation using the old device to successfully authenticate a user of the old device. That is, the user authenticates with the authentication server in order to enable transfer.

It should be understood that, in the cloud context, the processing circuitry may be formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in transferring soft token authentication capabilities from an old device to a new device.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to transferring soft token authentication capabilities from an old device to a new device via communications involving (i) the old device, the new device, and an authentication server. Since the old device is involved, the transfer is able to rely on trust invoked by the old device thus alleviating the need for a human to participate in real time during the transfer. Additionally, since the authentication server is involved, the transfer can be logged automatically and steps can be taken automatically to prevent restoration of the old device (e.g., the authentication token capabilities of old device can be disabled).

Figure 1:
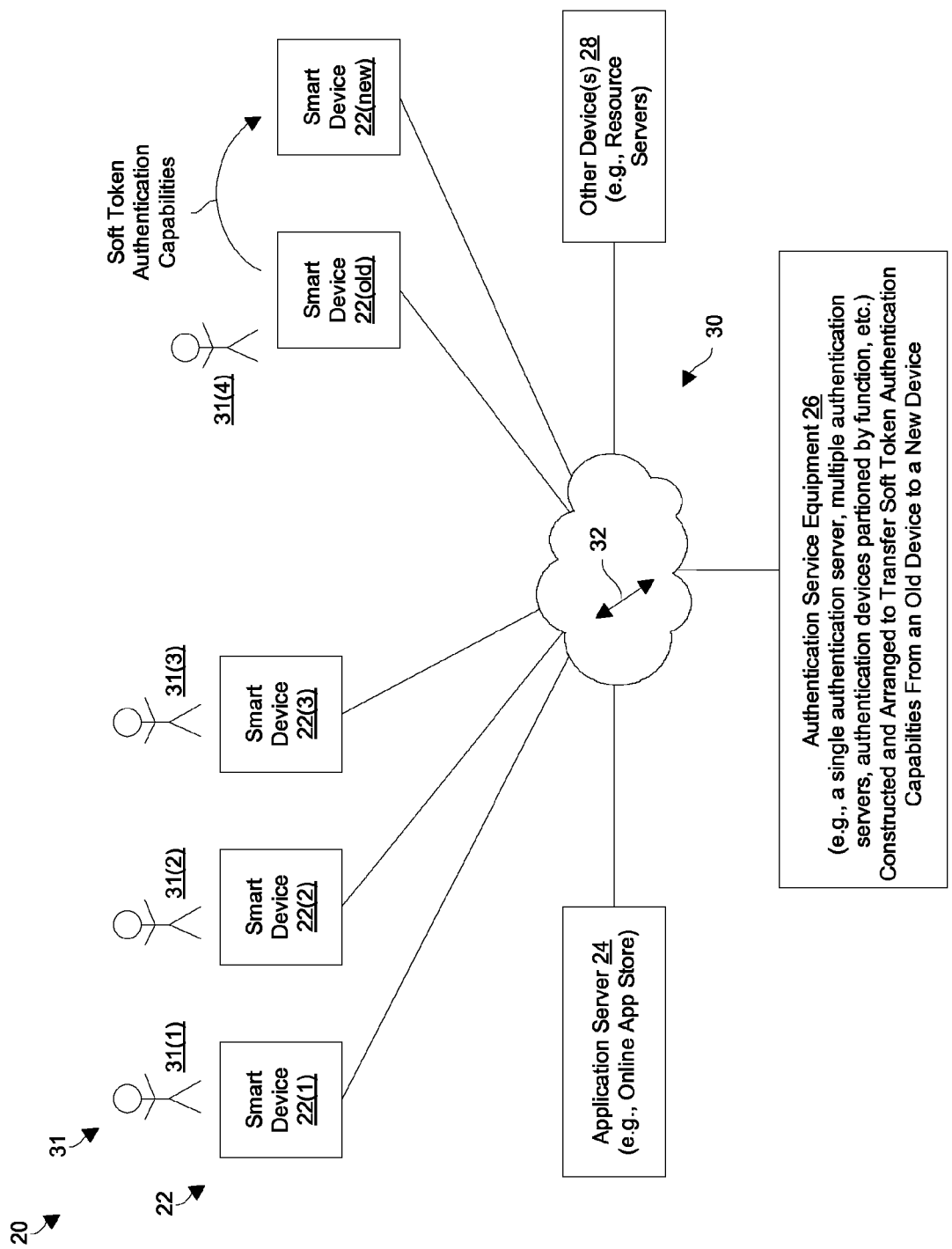
FIG. 1 is a block diagram of an electronic environment which is suitable for transferring soft token authentication capabilities from an old device to a new device.

FIG. 1 shows an electronic environment 20 which is suitable for transferring soft token authentication capabilities from an old device to a new device. The electronic environment 20 includes smart devices 22(1), 22(2), ... (collectively, smart devices 22), an application server 24, authentication service equipment 30 (hereinafter authentication server 28), other devices 28, and a communications medium 30.

The smart devices 22 are constructed and arranged to enable their respective users 31 to perform useful work (e.g., access files, use email, perform online transactions, play games, communicate with other users, etc.). During such activity, the users 31 may need to authenticate with the authentication server 26 using soft token authentication capabilities on their respective smart devices 22. As will be explained in further detail shortly, the various components of the electronic environment 20 enable effective transfer of soft token authentication capabilities from one smart device 22(old) to another smart device 22(new).

The application server 24 is constructed and arranged to offer and distribute applications to the smart devices 22. Among these applications is a soft token authentication application which, when installed on a smart device 22, carries out secure dynamic seed provisioning via a service such as CT-KIP. In some arrangements, the application server 24 is an online app store which offers users a variety of applications to its customers (e.g., users 31 of smart devices 22).

The authentication service equipment (or simply authentication server) 26 is constructed and arranged to authenticate the users 31. Such authentication may be required for the users 31 to access certain protected resources such as content locally stored on their smart devices and remote resources (e.g., see the other devices 28). Additionally, the authentication server 26 is constructed and arranged to perform secure dynamic seed provisioning to initially deploy token seeds to smart devices 22. Furthermore, the authentication server 26 is constructed and arranged to participate with smart devices 22 to transfer soft token capabilities from one smart device 22 to another smart device 22.

The other devices 28 represent additional apparatus on the electronic network 20 which may are may not be involved in authentication. For example, the other devices 28 may include resource servers which access the authentication server 26 to successfully authenticate users 31 prior to allowing the users 31 to access protected resources such as sensitive files and other content, email, VPN access, transactions, games, etc. The other devices 28 may also represent other entities on the Internet (e.g., resource servers which do not require authentication, hackers, malicious devices, etc.).

The communications medium 30 is constructed and arranged to connect the various components of the electronic network 20 together to enable these components to exchange electronic signals 32 (e.g., see the double arrow 32). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting LAN-based communications, SAN-based communications, cellular communications, combinations thereof, etc.

During operation, the authentication server 26 receives authentication requests and performs authentication operations to authenticate the users 31 of the smart devices 22. Such requests may be sent by the smart devices 22 directly to the authentication server 26 (e.g., the users 31 may be trying to access protected resources available locally on their smart devices 22). Such requests also may be sent from the other devices 28 (e.g., the users 31 may be trying to access protected resources available on protected resource servers using their smart devices 22, and the protected resource servers then communicate with the authentication server 26 to authenticate the users 31).

Additionally, the authentication server 26 communicates with the smart devices 22 to transfer soft token capabilities from one smart device 22 to another smart device 22. Such operation can be performed securely (e.g., trust is established with the old smart device 22, and the process includes the authentication server 26 which can eventually disable soft token capabilities on the old smart device 22) and automatically (i.e., without any need for an administrator to be involved in the transfer process in real time). It should be understood that, in some situations, the authentication server 26 may allow automated transfer of soft token capabilities for some smart devices 22 while preventing other smart devices 22 from doing this (e.g., controlled by policy). Further details will now be provided with reference to FIG. 2.

Figure 2:
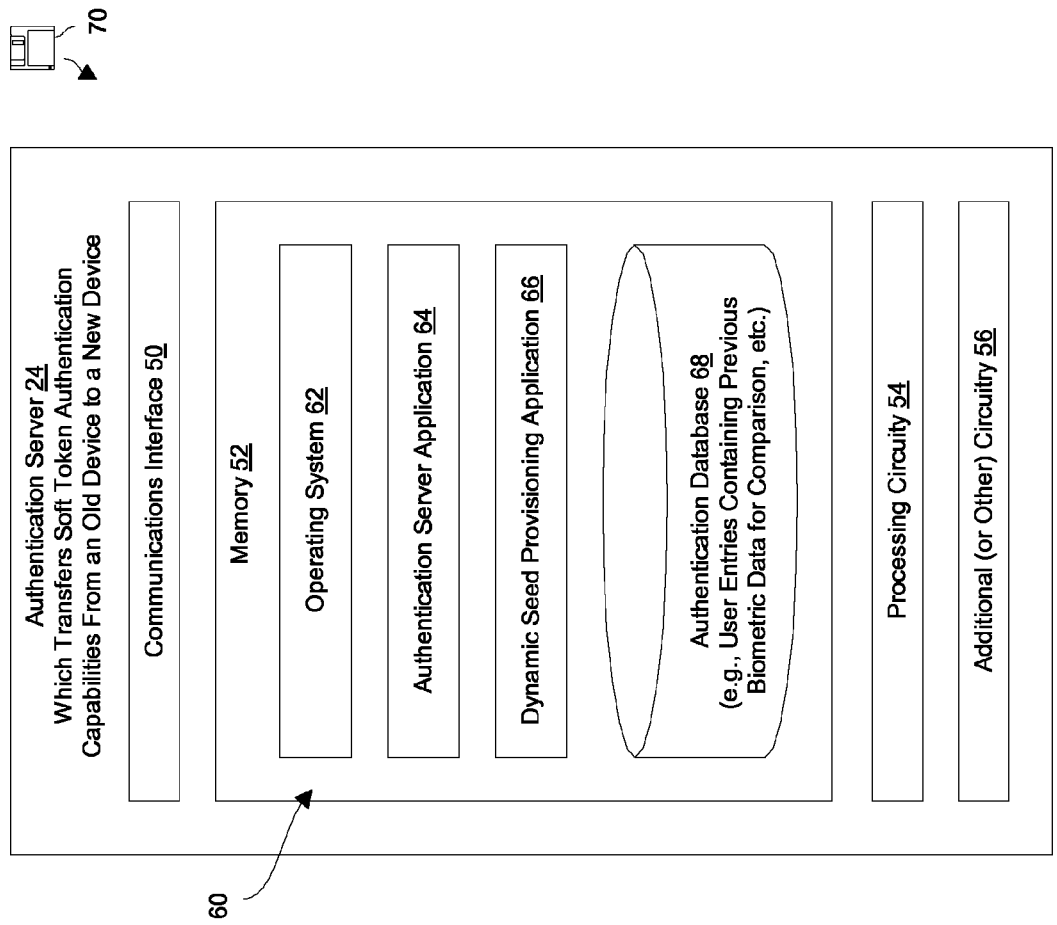
FIG. 2 is a block diagram of authentication service equipment which is involved in transferring soft token authentication capabilities from the old device to the new device.

FIG. 2 shows particular details of the authentication server 26 (also see FIG. 1). The authentication server 26 includes a communications interface 50, memory 52, processing circuitry 54, and additional (or other) circuitry 56.

The communications interface 50 is constructed and arranged to connect the authentication server 26 to the communications medium 30 to enable communications with other components of the electronic network 20 (FIG. 1). Such communications may be IP-based, cellular-based, cable-based, combinations thereof, and so on. Accordingly, the communications interface 50 enables the authentication server 26 to communicate with the smart devices 22 and other devices 28 to perform user authentication.

The memory 52 is intended to represent both volatile storage (e.g., DRAM, SRAM, etc.) and non-volatile storage (e.g., flash memory, etc.). The memory 52 stores a variety of software constructs 60 including an operating system 60 to manage resources of the authentication server 26, a specialized authentication server application 64 to perform authentication, a dynamic seed provisioning application 66, and an authentication database 68 (e.g., user profiles including seed information, etc.).

The processing circuitry 54 is constructed and arranged to operate in accordance with the various software constructs 60 stored in the memory 52. Such circuitry 54 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 70 is capable of delivering all or portions of the software constructs 60 to the authentication server 26. The computer program product 70 has a non-transitory (or non-volatile) computer readable medium which stores a set of instructions which controls one or more operations of the authentication server 26. Examples of suitable computer readable storage media include tangible articles of manufacture and apparatus which store instructions in a non-volatile manner such as CD-ROM, flash memory, disk memory, tape memory, and the like.

The additional circuitry 56 represents other portions of the authentication server 26. For example, the authentication server 26 may include a user interface to enable a user such as an administrator to enter input and receive output (user I/O) to operate the authentication server 26.

During operation, the processing circuitry 64 runs the authentication application 64 and the dynamic seed provisioning application 66 to form specialized control circuitry to perform various authentication server operations. For example, when the processing circuitry 64 runs the authentication application 64, the specialized control circuitry performs authentication operations to authenticate users of the smart devices 22. Additionally, when the processing circuitry 64 runs the dynamic seed provisioning application 66, the specialized control circuitry performs an exchange with smart devices 22 to securely provision the smart devices 22 with token seeds (e.g., by performing CT-KIP operations) and perhaps other information (e.g., time, serial number, other configuration data, etc.). Further details will now be provided with reference to FIGS. 3 and 4.

Figure 3:
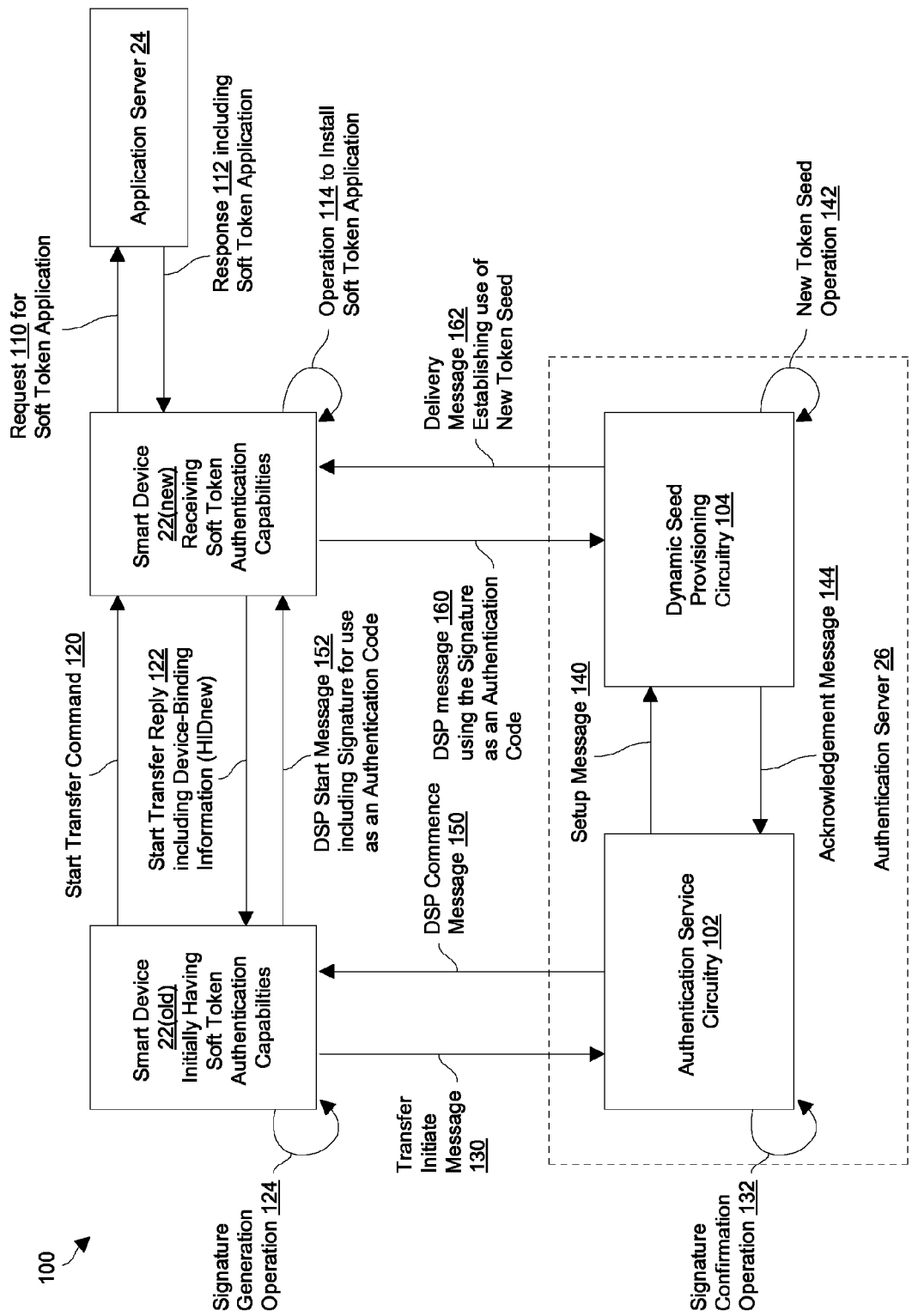
FIG. 3 is a block diagram illustrating particular communications between various components during soft token authentication capability transfer.
Figure 4:
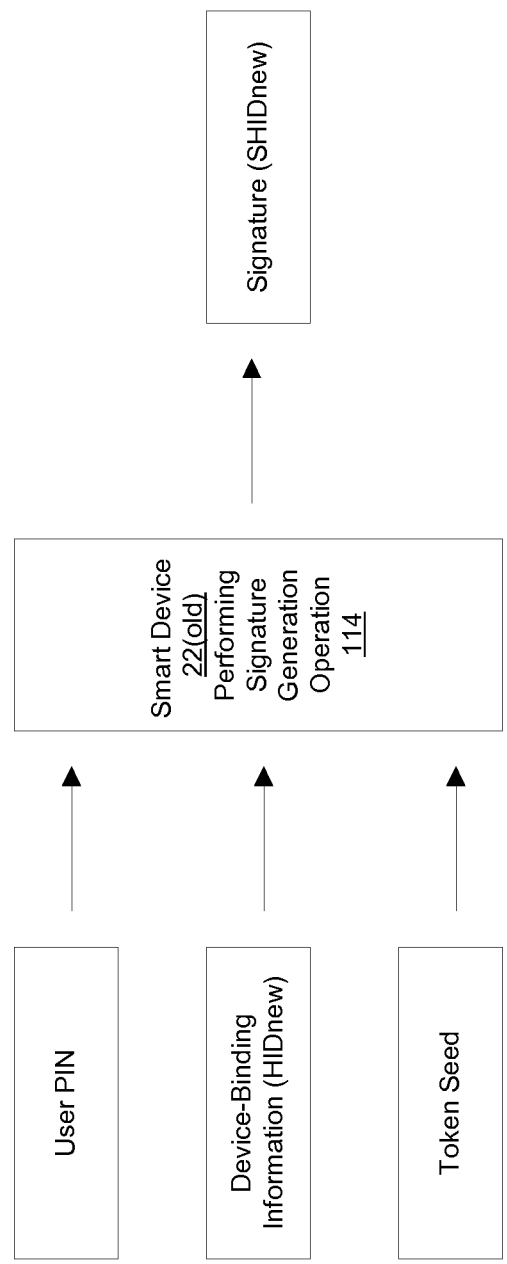
FIG. 4 is a block diagram illustrating details of an authentication code and a signature.

FIGS. 3 and 4 show particular details 100 of various communications that are exchanged between the various components of the electronic environment 20 and various operations that are performed when transferring soft token capabilities from a first smart device 22(old) to another smart device 22(new). FIG. 3 shows certain signals which are passed between the various components and certain operations. FIG. 4 shows how a signature is generated by the first smart device 22(old) based on particular inputs.

Initially, only the first smart device 22(old) has soft token authentication capabilities. For example, a user may have obtained and installed a soft token application from the application server 24 (FIG. 1) and then worked with an administrator of the authentication server 26 to perform a CT-KIP exchange with the authentication server 26 to provision the first smart device 22(old) with a token seed. Later, after a period of use (e.g., after a couple of years), the user may have obtained a new smart device 22(new) and now wishes to transfer the soft token authentication capabilities from the first smart device 22(old) to the new smart devices 22(new).

It should be understood that, as the various components communicate with each other, these components can rely on particular secure protocols to prevent attackers from stealing information (e.g., a short-range wireless protocol such as Bluetooth, SSL communications, direct copper cabling, and so on). Along these lines, prior to beginning the transfer process, the user of the old smart device 22(old) may authenticate with the authentication server 26 (also see FIG. 1) via a standard authentication method and establish a secure connection between the old smart device 22(old) and the authentication server 26. Such authentication may involve the user providing (i) a user personal identification number (PIN) and (ii) a passcode based on the token seed to the authentication server 26, and the authentication server 26 accessing the authentication database 68 to obtain particular user information and confirming that the user is authentic based on the user PIN and passcode.

It should be further understood that the authentication server 26 can be partitioned into separate modules which provide different services. By way of example, the authentication server 26 includes authentication service circuitry 102 which communicates with smart devices 22 for authentication purposes, and dynamic seed provisioning circuitry 104 which communicates with smart devices 22 to perform dynamic seed provisioning.

At this point, under user direction, the new smart device 22(new) similarly obtains a soft token application from the application server 24. In particular, the new smart device 22(new) sends a request 110 for the soft token application to the application server 24. In response, the application server 24 provides a response 112 including the soft token application. Upon receipt, the new smart device 22(new) performs an installation operation 114 to install the soft token application. As a result, the new smart device 22(new) is now provisioned with a soft token application.

Next, the user places the two smart devices 22(old), 22(new) in close physical proximity to enable short-rage wireless communication (e.g., Bluetooth). In some arrangements, the two smart devices 22(old), 22(new) additionally reduce the transmit power of their respective wireless communications circuits. The user then activates the soft token clients on both smart devices 22(old), 22(new), and places the soft token clients in a soft token transfer mode (e.g., the user enters appropriate commands into the respective user interfaces of the smart devices 22(old), 22(new)). The user then enters a start transfer command into the old smart device 22(old), which responds by (i) sending a start transfer command message 120 to the new smart device 22(new) and (ii) awaiting a reply. The user optionally then enters a complimentary start transfer command into the new smart device 22(new), which responds by sending a start transfer reply message 122 including device-binding information (HIDnew) to the old smart device 22(old). Alternatively, the interaction between the new smart device 22(new) and the old smart device 22(old) while in this transfer mode may automatically cause the new smart device 22(new) to send the device-binding information (HIDnew) to the old smart device 22(old).

The device-binding information is specific characterizing data which is capable of uniquely identifying the smart device 22(new) among other smart devices 22. It should be understood that such information may come from a predefined source within the smart device 22(new) which depends on the particular device type and the particular platform, e.g., the particular operating system running on the device. For example, a tablet or a smart phone running Windows® can provide a unique identifier (ID) as at least part of the device-binding information. As another example, a smart phone running iOS™ can provide a uniquely generated app ID as at least part of the device-binding information. As yet another example, a smart phone running Android™ can provide a MAC address or an IMEI number as at least part of the device-binding information, and so on.

FIG. 4 shows a signature generation operation 124 which is performed by the old smart device 22(old) upon receipt of the start transfer reply message 122 including the device-binding information (HIDnew). Recall that the soft token application of the old smart device 22(old) had previously been provisioned with a token seed. Additionally, the user of the old smart device 22(old) possesses a user personal identification number or PIN. The old smart device 22(old) generates a signature (SHIDnew) using the user's PIN, the device-binding information (HIDnew), and the token seed provisioned within the soft token application of the old smart device 22(old) as inputs.

It should be understood that other inputs are suitable for use by the signature generation operation 114. For example, the signature generation operation 114 can use device-binding information of the old smart device 22(old). In addition, the signature generation operation 114 can use a label to indicate the signature (SHIDnew) originated on the smart device 22(old) and is meant for a particular authentication server or servers 26. The authentication server(s) 26 could be identified by a URL, an IP address, or other method. As a further example, the signature generation operation 114 can use the time of day, a counter, or a random nonce as well, and so on. In some arrangements, a function H( ) is applied to the token seed and perhaps other information before its use in the signature generation operation 114. Ultimately, the device-binding information signature (SHIDnew) provides confidence (i.e., trust) that the old smart device is authentic and under control of the legitimate user.

Next, after the old smart device 22(old) performs the signature generation operation, the old smart device 22(old) sends a transfer initiate message 130 to the authentication server 26 (FIG. 3). The transfer initiate message 130 includes the device-binding information (HIDnew) obtained from the new smart device 22(new), and the signature (SHIDnew).

Upon receipt of the transfer initiate message 130, the authentication service circuitry 102 of the authentication server 26 performs a signature confirmation operation 132 to make sure that the smart device 22(old) can be trusted. In particular, the authentication service circuitry 102 evaluates the signature (SHIDnew) based on the device-binding information (HIDnew), i.e., the authentication service circuitry 102 verifies that the signature (SHIDnew) was derived from the user PIN, the device-binding information (HIDnew), and the token seed of the soft token application in the old smart device 22(old).

After the authentication service circuitry 102 confirms the signature (SHIDnew), the authentication service circuitry 102 provides a setup message 140 directing the dynamic seed provisioning circuitry 104 of the authentication server 26 to prepare a new token seed for dynamic seed provisioning. The setup message 140 includes the device-binding information (HIDnew) and the signature (SHIDnew). The dynamic seed provisioning circuitry 104 responds by performing a new token seed operation 142, and providing an acknowledgement message 144 back to the authentication service circuitry 102.

Next, the authentication service circuitry 102 sends dynamic seed provisioning commence message 150 to the old smart device 22(old). The dynamic seed provisioning commence message 150 indicates that the authentication server 26 is ready to proceed with dynamic seed provisioning of the new smart device 22(new).

Upon receipt of the dynamic seed provisioning commence message 150, the old smart device 22(old) provides dynamic seed provisioning start message 152 to the new smart device 22(new). The dynamic seed provisioning start message 152 includes (i) the signature (SHIDnew) and (ii) a network address of the dynamic seed provisioning circuitry 104 of the authentication server 26 (e.g., a URL), and directs the new smart device 22(new) to enter a dynamic seed provisioning exchange directly with the authentication server 26 (i.e., token seed provisioning between the new smart device 22(new) and the authentication server 26 with no involvement of the old smart device 22(old)).

In some arrangements, an additional signature (SHIDserver) is generated by the authentication server(s) 26 including a label indicating that this signature (SHIDserver) is from the authentication server 26 to the old smart device 22(old); the time of day; and other information included in SHIDnew. Responsive to this additional signature (SHIDserver), the old smart device 22(old) can verify the authentication server's acknowledgement of the transfer request.

In response, the new smart device 22(new) sends a dynamic seed provisioning message 160 to the authentication server 26. In particular, the new smart device 22(new) uses one or more of the signatures (HIDnew, SHIDserver) as an authentication code and establishes communications with the dynamic seed provisioning circuitry 104 of the authentication server 26 using the network address.

The dynamic seed provisioning circuitry 104 ultimately provides a delivery message 162 indicating that the new smart device 22(new) is properly provisioned with a new token seed. It should be understood that exchanges such as those associated with or similar to CT-KIP may involve multiple messages exchanged between the new smart device 22(new) and the authentication server 26.

At this point, the new smart device 22(new) is provisioned with a new token seed for proper operation. Accordingly, the old token seed of the old smart device 22(old) is no longer valid, and the authentication server 26 disables the old token seed of the old smart device 22(old). Thus, the soft token authentication capabilities are now effectively transferred to the new smart device 22(new), and the user is able to use the new smart device 22(new) as an authentication token in the future. Further detail will now be provided with reference to FIG. 5.

Figure 5:
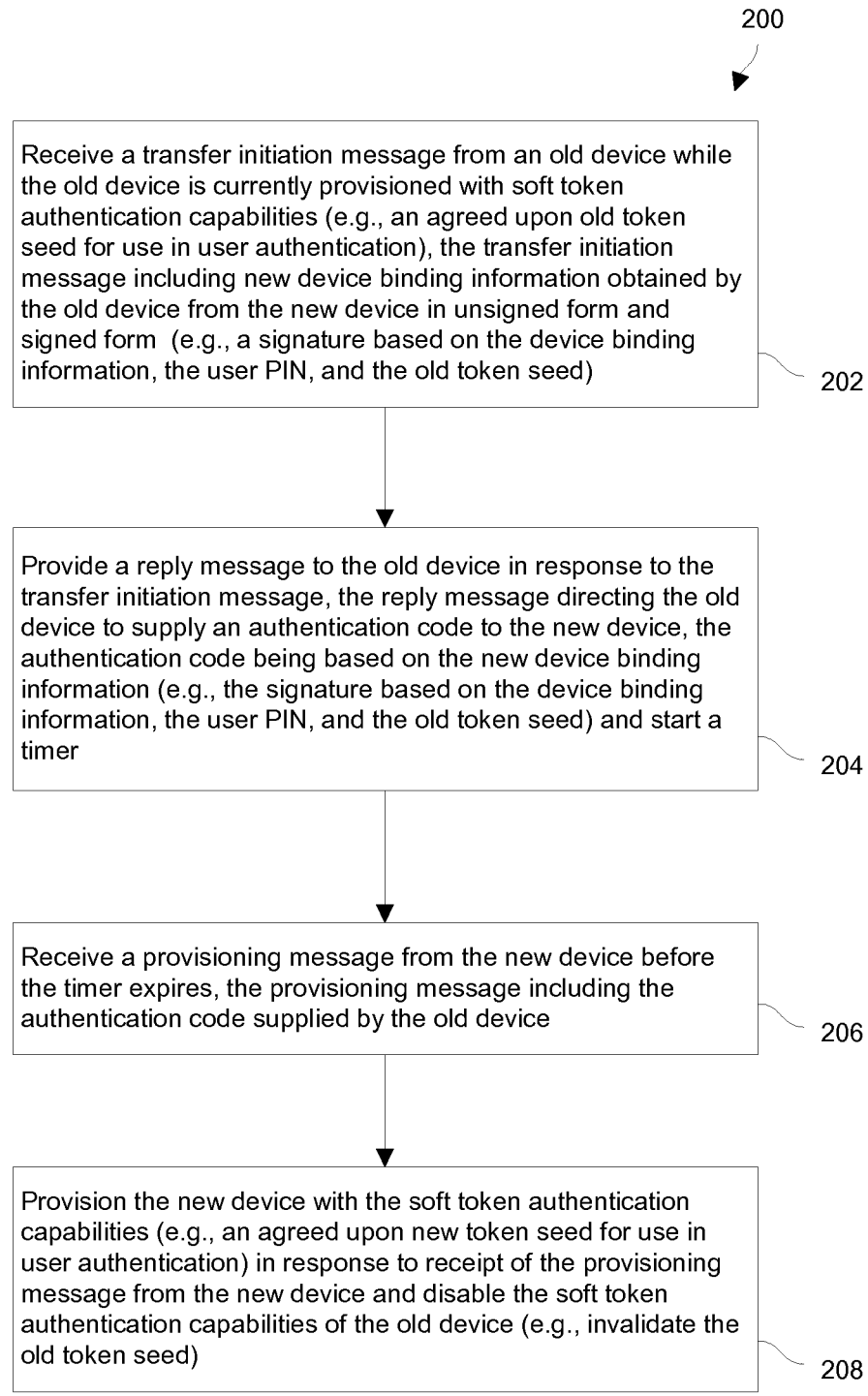
FIG. 5 is a flowchart of a procedure which is performed by the authentication service equipment of FIG. 2

FIG. 5 is a flowchart of a procedure 200 which is performed by the authentication server to transfer soft token authentication capabilities from an old device to a new device. Such soft token authentication capabilities refer to the establishment of a token seed which is agreed upon by the device and the authentication server (also see FIGS. 1 and 3).

At 202, the authentication server receives a transfer initiation message from the old device while the old device is currently provisioned with the soft token authentication capabilities (also see transfer initiate message 130 in FIG. 3). The transfer initiation message includes new device binding information obtained by the old device from the new device. In some arrangements and as mentioned earlier in connection with FIG. 3, the transfer initiation message can include (i) a first message portion which includes the new device binding information in non-signed form (i.e., HIDnew) and (ii) a second message portion which includes the new device binding information in a signed form (SHIDnew). The second message portion, which operates as a signature of the old device, can be based on (i) the new device binding information (HIDnew), (ii) the user personal identifier of the user, and (iii) the token seed stored in the old device.

At 204, the authentication server provides a reply message to the old device in response to the transfer initiation message (also see DSP commence message 150 in FIG. 3). The reply message directs the old device to supply an authentication code to the new device, the authentication code being based on the new device binding information. As shown in FIG. 3, the DSP commence message 150 does not need to include an authentication code.

At 206, the authentication server receives a provisioning message from the new device. The provisioning message includes the authentication code supplied by the old device (also see the DSP message 160 in FIG. 3), and the authentication server validates the authentication code. In some arrangements, the authentication server starts a timer when providing the earlier-mentioned reply message, and the authentication server must receive the provisioning message within a predefined time limit (e.g., 30 seconds, one minute, one hour, etc.) based on the timer or the provisioning message is considered invalid.

At 208, the authentication server provisions the new device with the soft token authentication capabilities in response to receipt of the provisioning message from the new device (e.g., see deliver message 162 in FIG. 3). In particular, the authentication server and the new device can perform a dynamic seed provisioning exchange such as or similar to CT-KIP, and a new token seed provisioned within the new device can be different (e.g., completely unrelated and independent) from the token seed provisioned within the old device.

As described above, improved techniques are directed to transferring soft token authentication capabilities between devices 22 via communications involving (i) an old device 22(old), a new device 22(new), and an authentication server 26. Since the old device 22(old) is involved, the transfer is able to rely on trust invoked by the old device 22(old) (i.e., use of a signature) thus alleviating the need for a human to participate during the transfer. Additionally, since the authentication server 26 is involved, the transfer can be logged and steps can be taken to prevent restoration of the old device 22(old) (e.g., the authentication token capabilities of old device 22(old) can be disabled).

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 such as the authentication server 26 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on. Such modifications and enhancements are intended to belong to various embodiments of the disclosure.

What is claimed is:

1. A method of transferring soft token authentication capabilities from an old device to a new device, the method comprising:
  receiving, by processing circuitry, a transfer initiation message from the old device while the old device is currently provisioned with a first seed-based data structure as at least some of the soft token authentication capabilities, the transfer initiation message including new device binding information obtained by the old device from the new device;
  providing, by the processing circuitry, a reply message to the old device in response to the transfer initiation message, the reply message directing the old device to supply an authentication code to the new device, the authentication code being based on the new device binding information and on the first seed-based data structure;
  receiving, by the processing circuitry, a provisioning message from the new device, the provisioning message including the authentication code from the old device; and
  provisioning, by the processing circuitry, the new device with a second seed-based data structure as at least some of the soft token authentication capabilities in response to receipt of the provisioning message from the new device;
  wherein receiving the transfer initiation message includes:
    obtaining, as parts of the transfer initiation message, (i) a first message portion which includes the new device binding information in non-signed form and (ii) a second message portion which includes the new device binding information in a signed form, the second message portion operating as a signature of the old device; and
  wherein the processing circuitry resides in an external server which is external to both the old device and the new device, the server being constructed and arranged to communicate with the old device and the new device over a network.

2. The method as in claim 1 wherein the old device stores a token seed; wherein the old device is under control of a user having a user personal identifier; and wherein obtaining the second message portion includes:
acquiring, as the second message portion, a signature data element which is based on (i) the new device binding information, (ii) the user personal identifier of the user, and (iii) the token seed stored in the old device.

3. The method as in claim 2, further comprising:
verifying, by the processing circuitry, the signature data element to confirm that the old device is trustworthy.

4. The method as in claim 2 wherein the reply message provided to the old device does not include the authentication code; and wherein receiving the provisioning message from the new device includes:
acquiring, as the authentication code, the signature data element from the new device.

5. The method as in claim 1 wherein, prior to receiving the transfer initiation message, the processing circuitry performs a first dynamic seed provisioning exchange with the old device to provision the old device with the soft token authentication capabilities; and wherein provisioning the new device includes:
performing, by the processing circuitry, a second dynamic seed provisioning exchange with the new device.

6. The method as in claim 5 wherein the first dynamic seed provisioning exchange provisions a first seed within the old device; and wherein performing the second dynamic seed provisioning exchange includes:
provisioning a second seed within the new device, the second seed being different from the first seed within the old device.

7. The method as in claim 1, further comprising:
in response to providing the reply message to the old device, starting a timer to impose a time limit for transferring soft token authentication capabilities to the new device.

8. The method as in claim 7, further comprising:
in response to receiving the provisioning message and prior to provisioning the new device, accessing the timer to confirm that the time limit has not expired.

9. The method as in claim 1, further comprising:
in response to provisioning the new device, disabling the soft token authentication capabilities provisioned on the old device.

10. The method as in claim 1, further comprising:
prior to receiving the transfer initiation message from the old device, performing an authentication operation using the old device to successfully authenticate a user of the old device.

11. The method as in claim 1 wherein, prior to the transfer initiation message being received from the old device, the new device binding information is received by the old device from the new device via a wireless communications session established by the old device and the new device while the old device and the new device are in close physical proximity to each other, each of the old device and the new device operating a respective wireless communications circuit at a reduced transmit power level during the wireless communications session.

12. The method as in claim 1 wherein the new device binding information in the signed form is modified based on at least one of: (i) a time of day value, (ii) a counter value, and (iii) a random nonce.

13. The method as in claim 1 wherein providing the reply message to the old device includes:
sending, as parts of the reply message, (i) a first message portion which includes a distinguished label from an authentication server and (ii) a second message portion which includes the combination of the new device binding information and the distinguished label in a signed form, the second message portion operating as a signature of the authentication server which the older device is capable of verifying to confirm that the authentication server is trustworthy.

14. The method as in claim 1 wherein provisioning the new device occurs while the new device is in communication with the server over the network.

15. An electronic apparatus, comprising:
a communications interface;
memory; and
control circuitry coupled to the communications interface and the memory, the memory storing instructions which, when carried out by the control circuitry, cause the control circuitry to:
receive a transfer initiation message from an old device through the communications interface while the old device is currently provisioned with a first seed-based data structure as at least some of soft token authentication capabilities, the transfer initiation message including new device binding information obtained by the old device from a new device,
provide a reply message to the old device through the communications interface in response to the transfer initiation message, the reply message directing the old device to supply an authentication code to the new device, the authentication code being based on the new device binding information and on the first seed-based data structure,
receive a provisioning message from the new device through the communications interface, the provisioning message including the authentication code from the old device, and
provision the new device with a second seed-based data structure as at least some of the soft token authentication capabilities in response to receipt of the provisioning message from the new device;
wherein the control circuitry, when receiving the transfer initiation message, is constructed and arranged to:
obtain, as parts of the transfer initiation message, (i) a first message portion which includes the new device binding information in non-signed form and (ii) a second message portion which includes the new device binding information in a signed form, the second message portion operating as a signature of the old device; and
wherein the control circuitry resides in an external server which is external to both the old device and the new device, the server being constructed and arranged to communicate with the old device and the new device over a network.

16. The electronic apparatus as in claim 15 wherein the old device stores a token seed; wherein the old device is under control of a user having a user personal identifier; and wherein the control circuitry, when obtaining the second message portion, is constructed and arranged to:
acquire, as the second message portion, a signature data element which is based on (i) the new device binding information, (ii) the user personal identifier of the user, and (iii) the token seed stored in the old device.

17. The electronic apparatus as in claim 16 wherein the reply message provided to the old device does not include the authentication code; and wherein the control circuitry, when receiving the provisioning message from the new device, is constructed and arranged to:

acquire, as the authentication code, the signature data element from the new device.

18. The electronic apparatus as in claim 15 wherein the control circuitry provisions the new device while the new device is in communication with the server over the network.

19. A computer program product having a non-transitory computer readable medium which stores a set of instructions to transfer soft token authentication capabilities from an old device to a new device, the set of instructions, when carried out by computerized circuitry, causing the computerized circuitry to perform a method of:

receiving, by the computerized circuitry, a transfer initiation message from the old device while the old device is currently provisioned with a first seed-based data structure as at least some of the soft token authentication capabilities, the transfer initiation message including new device binding information obtained by the old device from the new device;

providing, by the computerized circuitry, a reply message to the old device in response to the transfer initiation message, the reply message directing the old device to supply an authentication code to the new device, the authentication code being based on the new device binding information and on the first seed-based data structure;

receiving, by the computerized circuitry, a provisioning message from the new device, the provisioning message including the authentication code from the old device; and provisioning, by the computerized circuitry, the new device with a second seed-based data structure as at least some of the soft token authentication capabilities in response to receipt of the provisioning message from the new device;

wherein receiving the transfer initiation message includes:

obtaining, as parts of the transfer initiation message, (i) a first message portion which includes the new device binding information in non-signed form and (ii) a second message portion which includes the new device binding information in a signed form, the second message portion operating as a signature of the old device; and wherein the computerized circuitry resides in an external server which is external to both the old device and the new device, the server being constructed and arranged to communicate with the old device and the new device over a network.

20. The computer program product as in claim 19 wherein the old device stores a token seed; wherein the old device is under control of a user having a user personal identifier; and wherein obtaining the second message portion includes:

acquiring, as the second message portion, a signature data element which is based on (i) the new device binding information, (ii) the user personal identifier of the user, and (iii) the token seed stored in the old device.

21. The computer program product as in claim 20 wherein the reply message provided to the old device does not include the authentication code; and wherein receiving the provisioning message from the new device includes:

acquiring, as the authentication code, the signature data element from the new device after the new device receives the authentication code from the old device.

22. The computer program product as in claim 19 wherein provisioning the new device occurs while the new device is in communication with the server over the network.

* * * * *